United States Patent Office 3,168,558
Patented Feb. 2, 1965

3,168,558
ORNITHINE SYNTHESIS
George A. Kurhajec, Orinda, Richard J. Windgassen, Oakland, and George W. Hearne, Lafayette, Calif., assignors to Shell Oil Company, New York, N.Y., a corporation of Delaware
No Drawing. Filed Mar. 7, 1962, Ser. No. 177,963
3 Claims. (Cl. 260—534)

This invention relates to the preparation of ornithine from acrolein and hydrogen cyanide, and more particularly to its preparation from alpha-hydroxyglutaronitrile, and to certain novel intermediates involved therein.

Ornithine, also known as $\alpha,\delta$-diamino-n-valeric acid and 2,5-diaminopentanoic acid, is an amino acid of the formula $NH_2(CH_2)_3-CH(NH_2)CO_2H$. It is stereo isomeric, and may exist as either the laevo, or dextro isomer; chemical synthesis from non-asymmetric precursors usually yields the equimolar racemic mixture. It has been obtained from proteins after hydrolysis with alkali. Under these circumstances ornithine is obtained by secondary decomposition and isomerization from the amino acid, l-arginine. L-ornithine has, however, been isolated from tyrocidine (Biochem. J., 37: 3131 (1943)) and from gramicidin-S, ibid., 39: 363 (1945), and its presence in bacitracin is suspected. A known method for the preparation of l-ornithine from l-arginine is by means of the enzyme arginase obtained from pig livers (J. Biol. Chem., 94: 393 (1931–32)).

In fowl, the principal end product of nitrogen metabolism is uric acid. There is evidence to indicate that ornithine is an intermediary in the formation of this catabolite.

In animals, the principal end product of protein metabolism is urea. Krebs and Henseleit, working with liver slices, established the general chemical mechanisms by which ammonia is converted to urea. These workers incubated liver slices with ammonium salts using bicarbonate as a source of carbon dioxide and lactate as a source of energy, and studied the rate of urea production. They found the addition of ornithine greatly increased the rate of urea production. Arginine was found to be an intermediate product of the reaction. It is known that animal liver contains the enzyme arginase, which hydrolyzes arginine to ornithine and urea. Ornithine is the precursor of arginine and of the two only the latter enters generally into the structure of proteins.

From the above, it may be seen that ornithine plays an important role in the life of both fowl and animals. Its presence appears necessary for the production of uric acid in fowl and urea in animals. In its absence their life would appear to be greatly imperiled. The amount of ornithine required by both fowl and animals for the efficient production of uric acid and urea, respectively, of course, varies with metabolic circumstances and requirements. However, it appears that any ornithine deficiency may be overcome by the administration of ornithine or one of its salts, such as, for example, the monohydrochloride or dihydrochloride. In rats chronically exposed to carbon tetrachloride vapor, feeding of 50 mgm./day of ornithine gave almost complete protection against liver damage. It is suggested that this activity of ornithine can be attributed to its acceleration of the Krebs-Henseleit cycle which results in increased urea synthesis and removal of ammonia and other nitrogen containing catabolites produced by damaged liver (Clin. Chem. Acta, 4: 728–32 (1959)). This work would tend to indicate that ornithine may be useful in protecting the liver from other harmful vapors. In green plants, ornithine has been found to be essential in the synthesis of protein (Symposia Soc. Exptl. Biol., Nov. 13, 193–209 (1959)). It may be seen that ornithine plays an important role, not only in the life of fowl and animals, but in the life of green plants as well. Another important use of ornithine is that of an intermediate in the synthesis of the essential amino acid arginine. For example, l-arginine may be obtained from l-ornithine and cyanamide in aqueous solution in the presence of barium hydroxide (Ber. 32, 3191 (1902)).

It has now been discovered that ornithine, for the above and other uses, may be prepared by a novel process starting with acrolein and hydrogen cyanide. More particularly, it has now been found that ornithine may be prepared from a reaction product of one mole of acrolein with two moles of hydrogen cyanide. This reaction product is alpha-hydroxyglutaronitrile.

Briefly, the process of the present invention involves the following steps: adding two moles of hydrogen cyanide per mole of acrolein to give alpha-hydroxyglutaronitrile; aminating alpha-hydroxyglutaronitrile to alpha-aminoglutaronitrile; treating alpha-aminoglutaronitrile with carbon dioxide and ammonia as such or with a compound which will give carbon dioxide and ammonia such as ammonium carbonate to give 4-cyano-2-ureidobutyramide and/or 5-(2-cyanoethyl)hydantoin; treating 4-cyano-2-ureidobutyramide or 5-(2-cyanoethyl) hydantoin with ammonia and hydrogen in the presence of a reducing catalyst, e.g., Raney nickel, Raney nickel chromium, Raney cobalt or any of the Raney-type reducing catalysts, to give 3-ureidopiperidone, or treating 4-cyano-2-ureidobutyramide with hydrogen, acetic acid and acetic anhydride in the presence of a noble metal catalyst such as, for example, Adams catalyst, to give 4-acetamido-2-ureidovaleramide, or treating 5-(2-cyanoethyl)hydantoin with hydrogen, acetic acid and acetic anhydride in the presence of such as, for example, Adams catalyst to give 5-(3-acetamidopropyl)hydantoin; and hydrolyzing 5 - (3 - acetamidopropyl)hydantoin, 4-acetamido-2-ureidovaleramide or 3-ureidopiperidone to ornithine. Hydrolysis may be accomplished with an alkali metal hydroxide, alkaline earth metal hydroxide or their corresponding oxides. All of the above steps are most preferably carried out in the liquid phase.

The foregoing steps for the preparation of ornithine from acrolein and hydrogen cyanide may be more readily understood from the following illustrative reaction scheme:

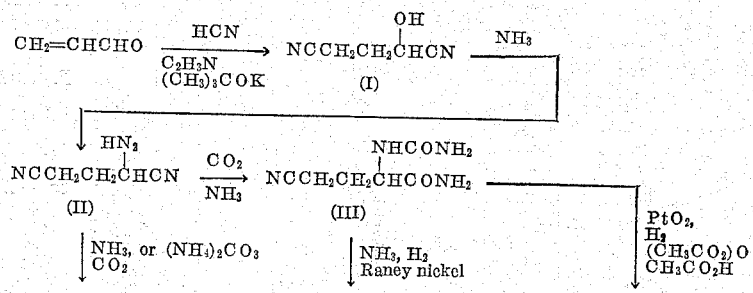

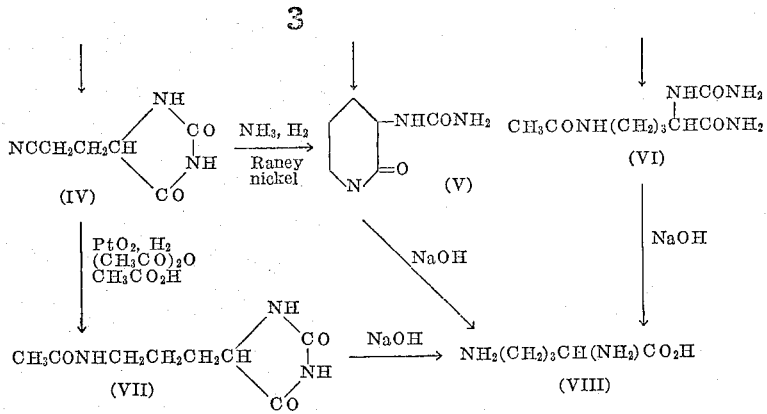

In the foregoing reaction scheme, alpha-hydroxyglutaronitrile (I) was prepared from one mole of acrolein and two moles of hydrogen cyanide in the presence of acetonitrile as solvent and potassium tert-butoxide as catalyst. Other suitable solvents which may be used to prepare (I) include a wide variety of the commonly employed organic solvents in addition to the lower alkyl nitriles, e.g., acetonitrile, such as, for example, the lower alkanols e.g., methanol, ethanol, propanol, isopropanol, tert-butyl alcohol, tert-amyl alcohol and the like; lower alkyl ethers, e.g., ethyl ether, methyl tert-butyl ether, and the like; aromatic hydrocarbons, e.g., benzene, and the like; halo-substituted aromatic hydrocarbons, e.g., chlorobenzene, and the like; nitro-substituted aromatic hydrocarbons, e.g., nitrobenzene, and the like; alkyl-substituted aromatic hydrocarbons, e.g., toluene, xylene, and the like; alkyl hydrocarbons, e.g., octane, and the like; halo-substituted alkyl hydrocarbons, e.g., carbon tetrachloride, and the like; cyclic alkyl dioxides, e.g., dioxane, and the like. Water can also be used as the solvent. Other suitable catalysts which may be used to prepare (I) include, for example, alkaline catalysts such as the alkali metal cyanides, for example, sodium cyanide, potassium cyanide and lithium cyanide; the alkali metals, for example, sodium, potassium and lithium; as well as the alkali metal alkoxides, for example, sodium methoxide, sodium ethoxide, sodium propoxide, sodium isopropoxide, sodium butoxide, sodium pentoxide, potassium ethoxide, potassium propoxide, potassium isopropoxide, lithium propoxide, sodium tert-butoxide, potassium tert-butoxide, and the like; and amino and ammonium bases, for example, trimethylamine, tripropylamine, triisopropylamine, tri-tert-butylamine, tetraethylammonium hydroxide, and the like; and the alkali metal hydroxides, e.g., sodium hydroxide, potassium hydroxide, and the like.

With reference to the foregoing reaction scheme, alpha-aminoglutaronitrile (II) was prepared by treating the above solution containing (I) wtih liquid ammonia. The temperature required for this treatment may range from about −40° C. to about 110° C., with a temperature of about 40° to about 60° C. preferred, and a temperature of about 50° C. most preferred. The pressure of this reaction may be atmospheric, subatmospheric or superatmospheric, with superatmospheric pressure most preferred.

The ureidoamide, 4-cyano-2-ureidobutyramide (III), was prepared by treating the solution now containing (II) in liquid ammonia with liquid carbon dioxide. The temperature required for this treatment may range from about 30° to about 130° C., with a temperature range of about 70° to about 100° C. preferred, and a temperature range of about 90° C. most preferred. The pressure of this reaction may be atmospheric, subatmospheric or superatmospheric, with superatmospheric pressure preferred. The hydantoin, 5-(2-cyanoethyl)hydantoin (IV), was prepared by treating the solution containing (II) with ammonium carbonate and water. The temperature required for this treatment may range from about 0° C. to about 100° C., with a temperature of about 50° C. to about 60° C. preferred, and a temperature of about 60° C. most preferred. The pressure of this reaction is preferably atmospheric. The solution containing (III) can be cooled and (III) collected by filtration for further reaction with a reducing catalyst, e.g. Raney nickel, and with hydrogen and ammonia, or the solution can be freed of traces of cyanide and, if necessary, interfering solvents, and then treated with ammonia, hydrogen and a reducing catalyst, e.g., Raney nickel, to give 3-ureidopiperidone (V). This treatment can be at atmospheric, subatmospheric and superatmospheric pressures, with superatmospheric pressure being preferred. The temperature of this treatment may range from about 40° to about 140° C. with a temperature range of about 70° to about 100° C., preferred. The solution containing (III) may be also treated with Adams catalyst, hydrogen, and acetic acid-acetic anhydride to give 4-acetamido-2-ureidovaleramide (VI). This reaction reaction can be at atmospheric, subatmospheric or superatmospheric, with superatmospheric preferred. The temperature of this reaction is preferably 0° to 75° C., with 25° C. most preferred. The 5-(2-cyanotheyl)hydantoin (IV) can be treated with liquid ammonia, hydrogen and Raney nickel catalyst to give 3-ureidopiperidone (V) or with Adams catalyst, hydrogen and acetic acid-acetic anhydride to give 5-(3-acetamidopropyl)hydantoin (VII) which can be hydrolyzed to ornithine (VIII). The 3-ureidopiperidone (V) and 4-acetamido-2-ureidovaleramide can also be hydrolyzed to ornithine (VIII) with e.g., an alkali hydroxide such as sodium hydroxide.

The present invention specifically contemplates the preparation of ornithine starting with the reaction of one mole of acrolein with two moles of hydrogen cyanide, and more particularly it contemplates the conversion of alpha-hydroxyglutaronitrile (I) to ornithine (VIII) by way of alpha-aminoglutaronitrile (II), 4-cyano-2-ureidobutyramide (III), 5-(2-cyanoethyl)hydantoin (IV), 3-ureidopiperidone (V), 4-acetamido-2-ureidovaleramide (VI) and 5-(3-acetamidopropyl)hydantoin (VII).

We have isolated dl-ornithine as the mono-hydrachloride and as dibenzoylornithine.

The process of this invention and the novel intermediates therein, may be more fully illustrated by the following specific examples arranged in step-wise form. It is to be understood, however, that the examples are in step form only for clarity of expression and continuity and that the process of the invention may be run batch-wise or in one continuous operation. The examples are merely illustrative and are not to be regarded as limiting. The basic teachings therein may be varied somewhat as will be understood by one skilled in the art to which this invention pertains.

EXAMPLE I

*Preparation of alpha-hydroxyglutaronitrile*

To a stirred four-liter vessel containing a solution of 108 ml. of 94% pure acrolein (1.5 moles) and 150 ml. of HCN (3.75 moles) in 750 ml. of acetonitrile and cooled to −20° C. there was added in one portion, 3.0 g. of powdered potassium tert-butoxide catalyst. The solution was then heated to boiling and refluxed for 50 minutes, the condenser being maintained at −20° C. to retain the HCN. Upon completion of the reaction there was obtained a solution rich in alpha-hydroxyglutaronitrile.

EXAMPLE II
*Preparation of alpha-aminoglutaronitrile*

To the solution containing alpha-hydroxyglutaronitrile, prepared in Example I in a shaking vessel was charged, after cooling, 1250 g. (75 moles) of liquid ammonia; this was heated for two hours at 50°. The vessel was then opened and most of the ammonia permitted to distill off, leaving a solution consisting principally of the desired alpha-aminoglutaronitrile in acetonitrile and ammonia.

EXAMPLE III
*Preparation of 4-cyano-2-ureidobutyramide*

To the solution containing alpha-aminoglutaronitrile prepared in Example II, was added 131 g. of liquid $CO_2$ (2.98 moles) and the contents of the vessel were heated at 90° C., for two hours under about 100 pounds' pressure. After standing overnight the vessel was opened and the slurry was collected in an open vessel to permit evaporation of most residual ammonia. The residue was dissolved in 750 ml. of water and concentrated to dryness and then 20 ml. of glacial acetic acid was added in 350 ml. of water and the mixture again concentrated to remove final traces of cyanide. The residue was then dissolved in 400 ml. of methanol and divided into four equal portions.

One portion was cooled and from this there was collected by filtration 14.0 g. (22%) of 4-cyano-2-ureidobutyramide, M.P. 143°–153° C. The infrared spectrum of this material was substantially the same as that of the material purified by recrystallization from methanol, as white crystals, M.P. 157°–159° C.

Analysis:

|  | C | H | N |
|---|---|---|---|
| Calculated ($C_6H_{10}N_4O_2$) | 42.5 | 5.8 | 32.8 |
| Found | 42.4 | 6.0 | 32.8 |

EXAMPLE IV
*Preparation of 3-ureidopiperidone*

Another portion of the solution, prepared in Example III wherein the residue was dissolved in 400 ml. of methanol, was charged into a 700 ml. rocking autoclave with 50 ml. additional methanol, 85 g. of liquid ammonia and 5 teaspoonsfuls (about 20 ml.) of W-7 Raney nickel catalyst. The autoclave was then pressured to 1750 lbs. with hydrogen and heated at 82°–84° C. for three hours, after which reduction was essentially complete. The vessel and contents were immediately cooled and the solid and liquid phases separated by filtration. To the residue obtained by concentrating the filtrate was added the aqueous solution obtained by extracting the catalyst residue with boiling water. This was concentrated to dryness in vacuo and the residue was recrystallized from methanol to give 16.0 g. of crystals, M.P. 215–22°, and a second crop of 5.1 g. of crystals, M.P. 217–22° (combined yield 35.7%) of 3-ureidopiperidone. The infrared spectrum of this material was substantially identical to that of material obtained by recrystallization from methanol, M.P. 236–238°, decomp.

Analysis:

|  | C | H | N |
|---|---|---|---|
| Calculated ($C_6H_{11}N_3O_2$) | 45.8 | 7.4 | 26.4 |
| Found | 45.8 | 7.3 | 26.4 |

EXAMPLE V
*Preparation of 3-ureidopiperidone*

To a 700 ml. rocking autoclave there was charged 30.0 g. of 4-cyano-2-ureidobutyramide, 270 ml. of absolute ethanol, one teaspoonful (about 4 ml.) of W-7 Raney nickel catalyst and 70.0 g. of liquid ammonia. The vessel was pressured to 1160 lb. with hydrogen and heated at 50–74°. Reduction was complete in two hours, the vessel was opened after venting, 300 ml. of water was added and the mixture was filtered. The filtrate was treated with $CO_2$ to precipitate alumina present and refiltered. This latter filtrate was concentrated to dryness in vacuo and recrystallization of the residue gave 17.4 g. (63%) of 3-ureidopiperidone, M.P. 236–9° decomp.

EXAMPLE VI
*Preparation of 4-acetamido-2-ureidovaleramide*

To a 400 ml. vessel there was charged 2.5 g. of 4-cyano-2-ureidobutyramide, prepared as in Example III, 300 mg. of platinum oxide catalyst, 50 ml. of acetic acid and 50 ml. of acetic anhydride. The vessel was pressured to 50 lbs. of hydrogen and after three hours of shaking reduction was complete. The catalyst was collected by filtration and the crystalline residue obtained on concentrating the filtrate was recrystallized from ethanol to give 2.64 g. (84%) of 4-acetamido-2-ureidovaleramide, M.P. 181–183° C.

Analysis:

|  | C | H | N |
|---|---|---|---|
| Calculated ($C_8H_{16}N_4O_3$) | 44.5 | 7.5 | 25.9 |
| Found | 44.6 | 7.7 | 25.4 |

EXAMPLE VII
*Preparation of 5-(2-cyanoethyl)hydantoin*

A solution of alpha-hydroxyglutaronitrile was prepared and aminated as previously described in Examples I and II. Immediately after amination the solution was withdrawn from the autoclave and nearly all ammonia removed by permitting the solution to warm to 25° under 200 mm. pressure. There was then added 800 ml. of water 326 g. of ammonium carbonate and 80 g. of sodium carbonate and the homogeneous solution was heated at 60° C. for 1.5 hours. There was then added 80 g. of ammonium chloride and the solution was concentrated to dryness. The organic product was extracted from inorganic salts with hot ethanol. The ethanolic solution was partially clarified by treating with a little charcoal; it was then concentrated to dryness. The residue, dissolved in 500 ml. of $H_2O$ was eluted through a column of 400 ml. of Dowex–50 ion exchange resin (acid form) and then 1500 ml. of water was used for washing the resin. This treatment removed dark impurities from the aqueous hydantoin solution. The aqueous solution was concentrated and the residue was crystallized from isopropanol to give 71 g. of the hydantoin of beta-cyanopropionaldehyde, M.P. 78–85°, that is, 5-(2-cyanoethyl) hydantoin. The infrared spectrum of this sample was identical to a sample further purified by recrystallization from iso-propanol, M.P. 89–92°.

Analysis:

|  | C | H | N |
|---|---|---|---|
| Calculated ($C_6H_8N_3O_2$) | 47.0 | 4.5 | 27.4 |
| Found | 47.1 | 4.7 | 27.2 |

The filtrate from the original crystallization was concentrated to dryness and the hydantoin was adsorbed from an aqueous solution on a column of Amberlite IRA–400 resin, hydroxyl form. The purified hydantoin was then eluted from the column with aqueous 5% acetic acid. The concentrated eluates were recrystallized from iso-propanol to give an additional 47.7 g. of hydantoin.

EXAMPLE VIII
*Preparation of 3-ureidopiperidone*

Reduction of the hydantoin.—To a 330 ml. autoclave there was charged 15.0 g. of the hydantoin prepared as in Example VII, one teaspoonful of Raney nickel catalyst, 125 ml. of methanol and 50 g. of liquid ammonia. The vessel was pressured to 1400 lbs. with hydrogen, placed in a rocking device and heated to 80° C. Reduction was complete in two hours. The contents of the cooled reduction vessel were poured into a beaker and part of the ammonia driven off by gentle warming. Then an equal volume of water was added to aid in dissolving the organic product and the solution was filtered. The concentrated filtrate and washings consisted of 13.3 g. of a crystalline solid, M.P. 223–225°, dec., which was identical to the product of Examples IV and V, 3-ureidopiperidone.

EXAMPLE IX

*Preparation of 5-(3-acetamidopropyl)-hydantoin*

A 3.0 g. sample of the hydantoin prepared in Example VII, in 50 ml. of acetic anhydride and 50 ml. of acetic acid, was shaken under 30–50 lbs. of hydrogen pressure with 0.4 g. of $PtO_2$ catalyst. After reduction, complete in two hours, the solution was filtered. The concentrated filtrate was recrystallized from isopropyl alcohol to yield 3.60 g. (92%) of 5-(3-acetamidopropyl)-hydantoin crystals, M.P. 138–6° dec.

Analysis:

|  | C | H | N |
|---|---|---|---|
| Calculated ($C_8H_{13}N_3O_3$) | 48.3 | 6.6 | 21.1 |
| Found | 48.6 | 6.7 | 20.6 |

EXAMPLE X

*Preparation of dl-ornithine monohydrochloride*

A 3.0 g. portion of 4-cyano-2-ureidobutyramide, prepared as in Example III, was reduced in a similar fashion as in Example V and the crude reduction product hydrolyzed to dl-ornithine by boiling under reflux in a solution of 15.0 g. of NaOH in 75 ml. of water for 15 hours. This solution, after acidification was hydrochloric acid, was concentrated to dryness in vacuo and the desired material separated from sodium chloride by hot methanol extraction. The methanol extracts were concentrated in vacuo and the resulting residue dissolved in 10 ml. of water. This aqueous solution was treated with concentrated ammonia until a pH of 8 was obtained and then ethanol was added to faint cloudiness. There was obtained dl-ornithine monohydrochlorine. The dl-ornithine monohydrochloride isolated in this manner was recrystallized from water-ethanol to give 0.51 g. of dl-ornithine monohydrochloride, M.P. 223–6°.

Analysis:

|  | C | H | N |
|---|---|---|---|
| Calculated ($C_5H_{13}N_2O_2Cl$) | 35.4 | 7.7 | 16.5 |
| Found | 35.3 | 7.7 | 15.8 |

EXAMPLE XI

*Preparation of dl-ornithine monohydrochloride*

The procedure of Example IX was repeated using 4.0 g. of the hydantoin prepared as in Example VII and 0.5 g. of $PtO_2$ catalyst. The crude isolated product was boiled under reflux for six hours with 8.0 g. of sodium hydroxide in 45 ml. of water. From this ornithine-containing solution there was isolated, using the method previously described, 2.5 g. (67%) of ornithine monohydrochloride.

EXAMPLE XII

*Preparation of N,N'-dibenzoyl-dl-ornithine*

A solution of 5.0 g. of 3-ureidopiperidone prepared as in Example V, and 14.0 g. of NaOH in 70 ml. of water was boiled for 1.5 hours diluted with 70 ml. of water and then boiled to the original volume to remove ammonia. The solution was then stirred and maintained at 0° C. for 1.5 hours with 18.0 g. of benzoyl chloride and then treated to pH 3 with HCl. The solids were collected, washed with ether and water and recrystallized from ethanol to give 7.2 g. (67%) of N,N'-dibenzoyl-dl-ornithine, M.P. 186–87°, identical with an authentic sample by mixed melting point and infrared comparison.

It is to be understood that the invention is not to be limited to the exact details of operation shown and described, as obvious modifications and equivalents will be apparent to one skilled in the art and the invention is, therefore, limited only by the scope of the appended claims.

We claim as our invention:
1. The process for the production of ornithine which comprises the steps of:
   (1) treating alpha-aminoglutaronitrile with carbon dioxide and ammonia in the liquid phase at a temperature from about 30° C. to about 100° C. to give 4-cyano-2-ureidobutyramide and 5-(2-cyanoethyl)hydantoin;
   (2) treating 4-cyano-2-ureidobutyramide and 5-(2-cyanoethyl)hydantoin with ammonia, hydrogen and Raney nickel in the liquid phase at a temperature from about 40° C. to about 140° C. to give 3-ureidopiperidone;

3. The process for the production of ornithine which
2. The process for the production of ornithine which comprises the steps of:
   (a) treating alpha-aminoglutaronitrile with liquid carbon dioxide and liquid ammonia in the liquid phase at a temperature from about 30° C. to about 130° C. to give 4-cyano-2-ureidobutyramide;
   (b) treating 4-cyano-2-ureidobutyramide with ammonia, hydrogen and Raney nickel catalyst in the liquid phase at a temperature from about 40° C. to about 140° C. to give 3-ureidopiperidone; and
   (c) hydrolyzing 3-ureidopiperidone to give ornithine.
3. The process for the production or ornithine which comprises the steps of:
   (a) treating alpha-aminoglutaronitrile with aqueous carbon dioxide and ammonia at a temperature of from 0° C. to 100° C. to give 5-(2-cyanoethyl)hydantoin;
   (b) reacting 5-(2-cyanoethyl)hydantoin with ammonia, hydrogen and Raney nickel catalyst in the liquid phase at a temperature of from about 40° C. to 140° C. to give 3-ureidopiperidone; and
   (c) hydrolyzing 3-ureidopiperidone to give ornithine.

References Cited by the Examiner

UNITED STATES PATENTS

| | | | |
|---|---|---|---|
| 1,915,334 | 6/33 | Salzberg et al. | 260—243 |
| 2,075,359 | 3/37 | Salzberg et al. | 167—22 |
| 2,397,667 | 4/46 | Kaiser et al. | 260—553 |
| 2,401,196 | 5/46 | Senkus | 260—534 |
| 2,425,320 | 8/47 | Hill | 252—149 |
| 2,460,603 | 2/49 | Semon | 260—465.4 |
| 2,479,690 | 8/49 | Morey | 260—293.2 XR |
| 2,557,920 | 6/51 | White. | |
| 2,642,459 | 6/53 | White | 260—534 |
| 2,649,456 | 8/53 | Walter et al. | 260—294 |
| 2,711,413 | 6/55 | Campaigne | 260—309.5 |
| 2,870,201 | 1/59 | Pollack | 260—534 |
| 2,976,218 | 3/61 | Gorton. | |

OTHER REFERENCES

Greenstein: Chemistry of the Amino Acids, vol. 3, pp. 2477–2490 (1961).

Paden: J.A.C.S., vol. 58, pp. 2487–99 (1936).

LORRAINE A. WEINBERGER, *Acting Primary Examiner.*

JOHN D. RANDOLPH, LEON ZITVER, *Examiners.*

UNITED STATES PATENT OFFICE
CERTIFICATE OF CORRECTION

Patent No. 3,168,558                              February 2, 1965

George A. Kurhajec et al.

It is hereby certified that error appears in the above numbered patent requiring correction and that the said Letters Patent should read as corrected below.

Columns 1 and 2, at the bottom of the columns, for that portion of the reaction scheme reading:

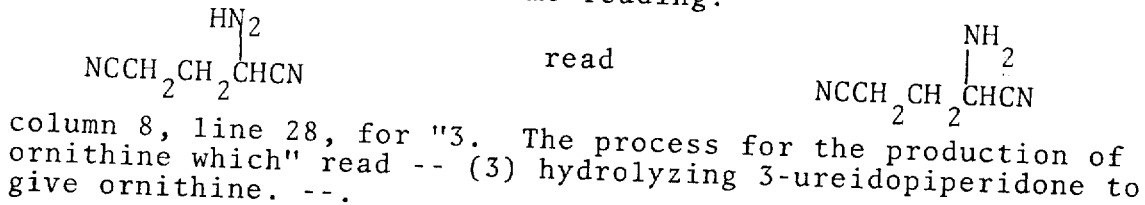

column 8, line 28, for "3. The process for the production of ornithine which" read -- (3) hydrolyzing 3-ureidopiperidone to give ornithine. --.

(SEAL)      Signed and sealed this 3rd day of August 1965.

Attest:

ERNEST W. SWIDER
Attesting Officer

EDWARD J. BRENNER
Commissioner of Patents